(No Model.)
G. ESTERLY.
ADJUSTABLE SEAT FOR GRAIN HARVESTING AND BINDING MACHINES.
No. 327,932. Patented Oct. 6, 1885.
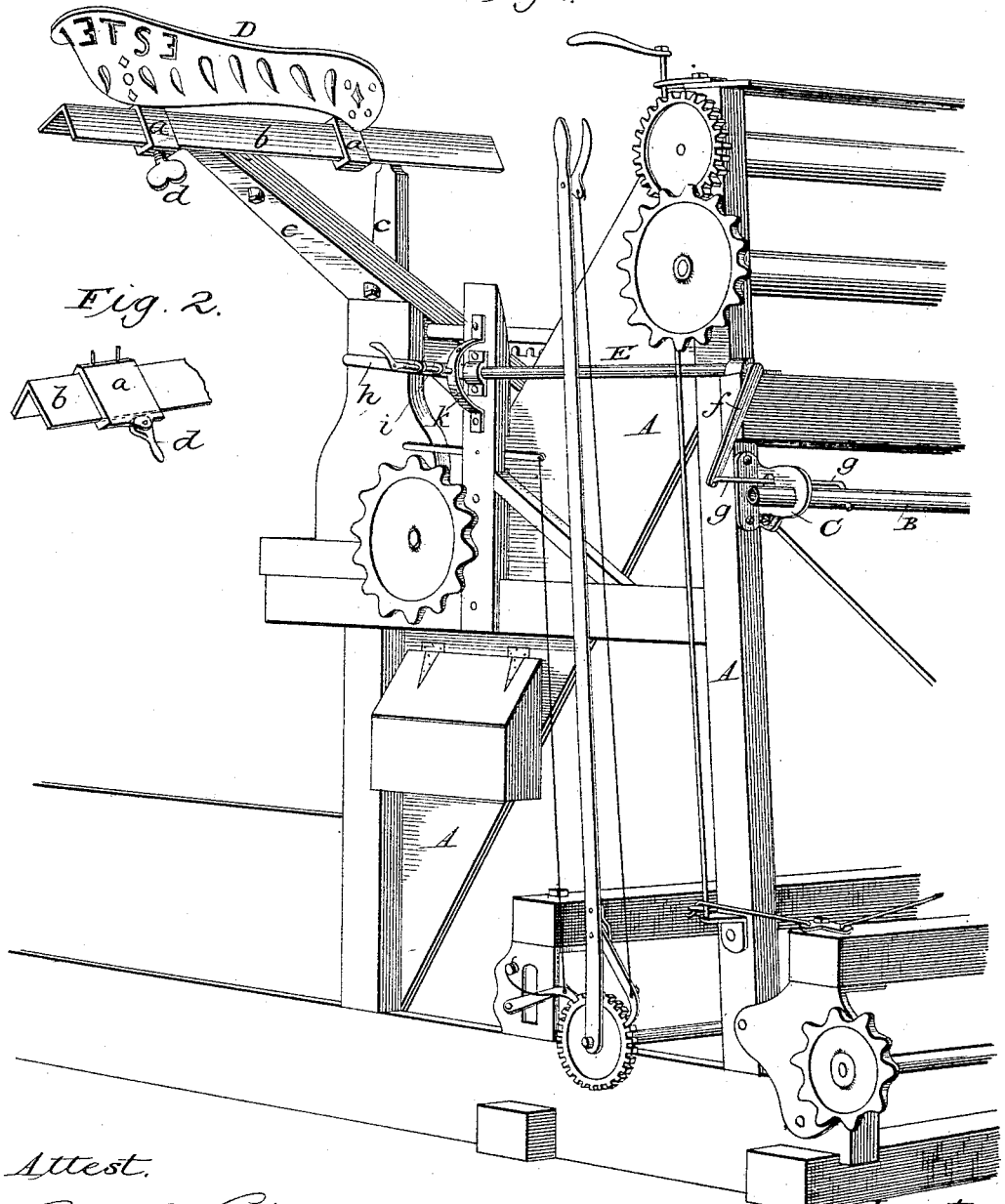

United States Patent Office.

GEORGE ESTERLY, OF WHITEWATER, WISCONSIN, ASSIGNOR OF ONE-FOURTH TO GEORGE W. ESTERLY, OF SAME PLACE.

ADJUSTABLE SEAT FOR GRAIN HARVESTING AND BINDING MACHINES.

SPECIFICATION forming part of Letters Patent No. 327,932, dated October 6, 1885.

Application filed March 1, 1884. Serial No. 122,644. (No model.)

*To all whom it may concern:*

Be it known that I, GEORGE ESTERLY, of Whitewater, in the county of Walworth and State of Wisconsin, have invented certain Improvements in Adjustable Seats for Grain Harvesting and Binding Machines, of which the following is a specification.

This invention has reference to that class of harvesting and binding machines wherein the binding mechanism is adjustable forward and backward upon the harvester to secure the application of the band centrally to grain varying in length, and in which the driver's seat is also adjustable forward and backward, in order that the proper balance or poise of the machine on the carrying-wheels may be maintained under the different adjustments of the binder.

The invention consists in a seat provided with a bearing-plate arranged to slide on an inverted-V-shaped bar, and provided with a clamping device adapted to be operated by the rider while in his seat.

The accompanying drawings represent in perspective so much of the rear stubble-corner of the harvesting and binding machine as is necessary to an understanding of my invention.

Except as to the details, which will be hereinafter specified, the harvesting and binding mechanism may be of any ordinary construction.

The drawings represent portions of a machine similar to that represented in Letters Patent granted to me on the 16th day of October, 1882, No. 266,254, and August 1, 1882, No. 262,026, viewed in perspective from the rear side.

Referring to the drawings, Figure 1 is a perspective view of my seat as it appears in position on a binding and harvesting machine. Fig. 2 is a perspective view of the seat-fastening device in a modified form.

A represents the elevator-frame or A-frame of the harvester, the outer side of which gives support in the usual manner to the binding mechanism overhanging the main wheel on the stubble side of the machine.

The binding-machine proper will be provided, as usual, with a horizontal supporting-rod, B, secured thereto and extending fore and aft of the machine. This rod is supported by and arranged to slide longitudinally within bracket-plates C, bolted firmly to the elevator-frame in the same or substantially the same manner as in my original machine, the end motion of the rods within their supports permitting the harvester to move forward and backward in a manner well understood by those skilled in the art.

Upon the harvester, at one side of the elevator-frame in the ordinary position, I locate a driver's seat, D; but instead of mounting the seat in the ordinary manner, I provide it on the under side with clips or bearing-plates $a$, which are arranged to slide forward and backward on a horizontal bar, $b$, of an inverted-V shape in cross-section. This supporting-bar extends fore and aft of the machine, and is secured rigidly in position on the upper ends of supporting-standards $c$. The rear clip, $a$, is provided with a thumb-screw, $d$, arranged to bear against the supporting-bar and thus confine the seat in place thereon. The screw is located in such position that it may be readily reached by the operator while occupying the seat, so that by loosening the screw the seat may be released and permitted to slide freely forward and backward. In practice it is found that when the seat is mounted in this manner the driver may readily effect the forward and backward adjustment by the use of his legs, and without the necessity of employing his hands for the purpose.

The employment of the angle-iron as a support for the seat is advantageous, in that it combines strength and lightness, that it prevents the seat from tipping sidewise, and that it causes the seat to be held with great firmness when the screw is tightened. While it is preferred to employ the clamping-screw, it is to be understood that an eccentric or other equivalent device may be substituted therefor, as shown in Fig. 2.

It will be understood that by moving the seat forward and backward, so as to place the weight of the rider at a greater or less distance in rear of the axle, the poise or balance of the machine may be maintained under the various adjustments of which the binder is susceptible.

Having thus described my machine, what I claim is—

The seat provided with the bearing-plate, in combination with the inverted-V-shaped bar, and the clamping device $d$, adapted to be operated by the rider while in his seat.

GEORGE ESTERLY.

Witnesses:
 E. I. THOMPSON,
 J. H. PAGE.